United States Patent [19]

Tarozzi

[11] Patent Number: 4,667,583
[45] Date of Patent: May 26, 1987

[54] AUTOMATIC DRIP COFFEE MAKER

[75] Inventor: Richard A. Tarozzi, Gales Ferry, Conn.

[73] Assignee: King-Seeley Thermos Company, Norwich, Conn.

[21] Appl. No.: 818,772

[22] Filed: Jan. 14, 1986

[51] Int. Cl.⁴ .............................................. A47J 31/00
[52] U.S. Cl. ................................... 99/279; 248/240.4
[58] Field of Search ................ 99/279, 295, 300, 306, 99/304, 305, 284; 426/433; 248/240.4, 311.2, 311.3; 211/74

[56] References Cited

U.S. PATENT DOCUMENTS 3,620,155  11/1971  Bixby ..................................... 99/295
4,506,597  3/1985  Karns ..................................... 99/295
4,540,146  9/1985  Basile ..................................... 99/279

Primary Examiner—Robert W. Jenkins
Attorney, Agent, or Firm—Harness, Dickey & Pierce

[57] ABSTRACT

An automatic coffee maker that is particularly adapted for mounting other than upon a counter surface. The coffee maker comprises a housing having a water compartment receiving cavity and a filter compartment receiving cavity each adapted to receive respective of water compartments and filter compartments. A coffee container supporting member is pivotally supported by the housing for movement between an extended position for supporting a coffee container and a retracted position wherein the supporting member nests around the coffee maker to provide a compact configuration.

6 Claims, 2 Drawing Figures

AUTOMATIC DRIP COFFEE MAKER

BACKGROUND OF THE INVENTION

This invention relates to an automatic coffee maker and more particularly to an improved, compact non-counter top supported automatic coffee maker.

Automatic drip coffee makers all embody a water container, a filter compartment in which a filter containing ground coffee is contained and a support for holding a container into which the brewed coffee is dispensed from the filter. Because these elements are all fixed in relation to each other with the normal automatic drip coffee maker, the size of the unit is generally established and is not easily changed. In addition, it is the normal practice to brew the coffee into a glass flask and the support for the flask is heated in order to keep the coffee at an elevated temperature. This further fixes the overall size and configuration of the coffee maker.

Although it is desirable to provide an automatic drip coffee maker that need not be supported on a counter top, the size of the previously proposed units has offered no advantages to wall or under cabinet mounting. That is, the units have such significant height that even if they are mounted on a wall or under a cabinet they still encroach significantly upon the counter top area.

It is, therefore, a principal object of this invention to provide an improved and compact automatic drip coffee maker.

It is a further object of this invention to provide an automatic drip coffee maker that is compact when not in use and may conveniently be mounted under a cabinet or on a wall without encroaching on the counter top space.

SUMMARY OF THE INVENTION

This invention is adapted to be embodied in an automatic coffee maker that is adapted to be supported by means other than by standing upon a counter top. The coffee maker comprises a main housing, a water compartment carried by the main housing and adapted to hold an amount of water and heating means for heating the water from the water compartment. A filter component is carried by the main housing and is adapted to contain coffee. Means communicate heated water from the heating means to the filter compartment and the filter compartment has a brewed coffee outlet for discharging liquid brewed coffee. A support means is movably carried by the housing between an extended brewed coffee container supporting position wherein a coffee container is supported with its mouth positioned to receive the brewed coffee and a retracted position wherein the container supporting means is nested around the other components of the coffee maker.

DETAILED DESCRIPTION OF THE PREFERRED EMBODIMENT

Figure 1:
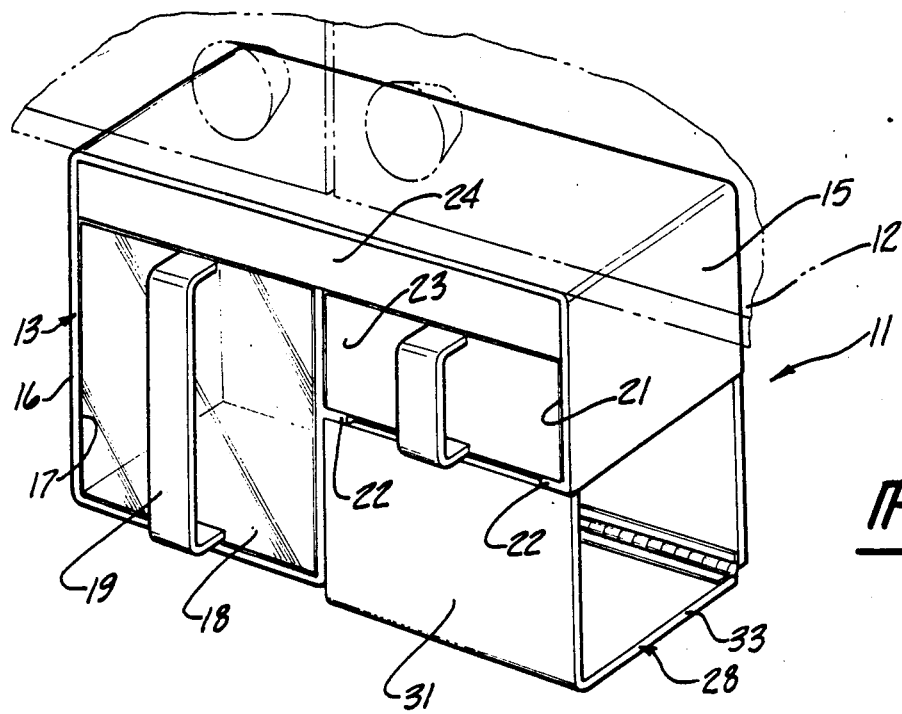
FIG. 1 is a perspective view of an automatic coffee maker constructed in accordance with an embodiment of the invention and is depicted in its storage position.

In the drawings the reference numeral 11 indicates generally an automatic drip coffee maker constructed in accordance with an embodiment of the invention. The coffee maker 11 is particularly adapted to be mounted on a wall or under a cabinet, shown in phantom and identified by the reference numeral 12. It is to be understood, however, that other mounting arrangements may be employed.

The automatic drip coffee maker 11 is comprised of an outer housing assembly, indicated generally by the reference numeral 13 which includes a top 14, short side wall 15, a longer side wall 16, and a stepped lower face. at one side of the housing 13, adjacent the side wall 16 there is provided a cavity which opens through the front face of the housing 13 and which is identified by the reference numeral 17.

A removable water compartment 18 is slidably supported within the cavity 17 and is adapted to be filled with water for the brewing of coffee. The water compartment 18 is provided with a handle portion 19 so as to facilitate insertion and removal. Either the front face of the water compartment 18 may be transparent or it may be provided with a sight gauge and suitable legend so as to indicate the number of cups of coffee brewed for a given water level.

Adjacent to the cavity 17, the housing 13 is provided with a further cavity 21 which is adjacent to the short side wall 15. The cavity 21 is bounded at its lower edge by means of a pair of horizontally extending flanges 22.

A filter container 23 is slidably supported within the cavity 21 on the flanges 22 and is configured so as to provide a space for holding a removable coffee filter (not shown) into which coffee grounds may be inserted. The lower end of the filter container 23 is provided with a centrally disposed discharge spout.

The housing 13 is further provided with a horizontally extending panel 24 above the cavities 17 and 21 and which contains a heating element for heating the water from the water container 18 and for transferring it to the filter container 23 so as to discharge the heated water into engagement with the ground coffee. In addition, a suitable control mechanism including an ON/OFF switch (not shown) may be positioned behind the panel 24.

Immediately below and behind the cavity 21 the housing 13 is provided with a rear wall 25 that terminates at a lower edge 26 that is disposed at approximately the same level as a lower face 27 of the cavity 17. A coffee container support, indicated generally by the reference numeral 28, and having a generally L-shaped configuration is connected to the edge 27 in a pivotal manner by means of a hinge 29. The coffee container support 28 has a surface 31 onto which a coffee container, indicated generally by the reference numeral 32 may be supported when the support 28 is in its operative position as shown in FIG. 2.

The support 28 also has a rear face 33 that forms an extension of the wall 25 when the support 28 is in its operative position. When the support 28 is folded to its storage position (FIG. 1) the wall 33 forms a lower face and offers a compact configuration and nests around a portion of the remainder of the coffee maker 11. Hence, an extremely compact configuration is formed.

Figure 2:
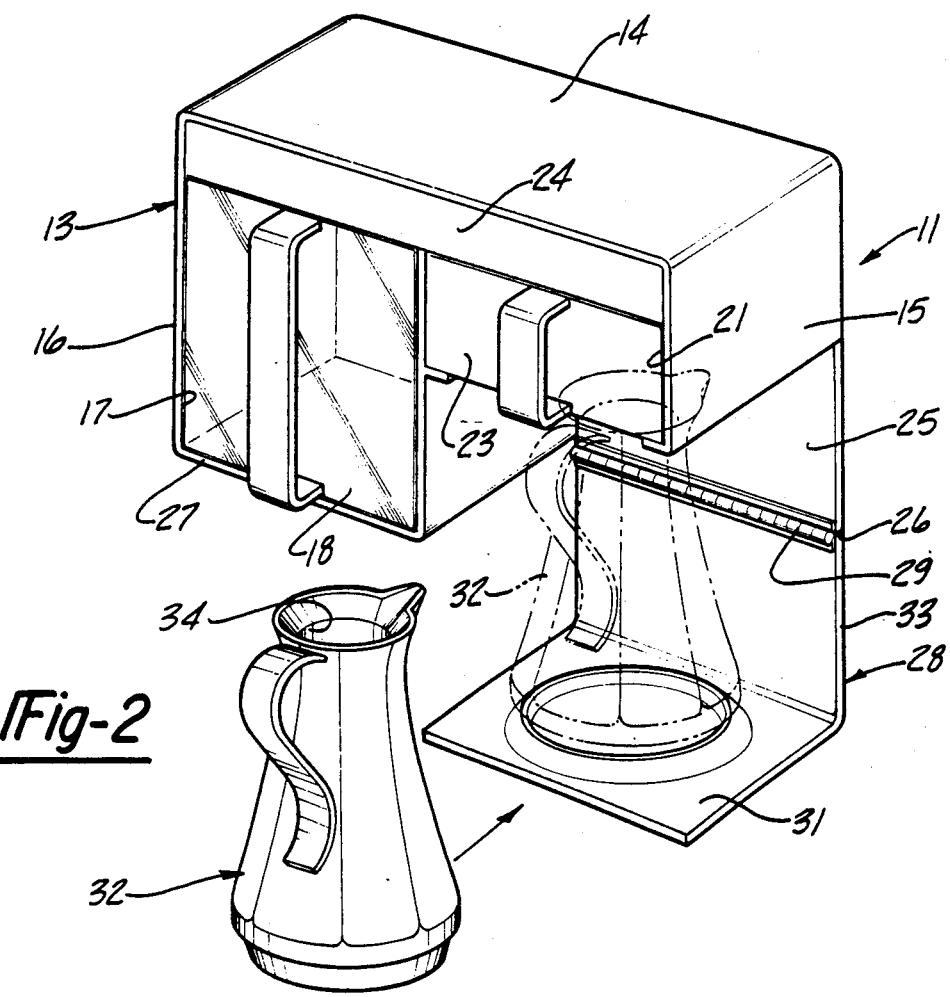
FIG. 2 is a perspective view, in part similar to FIG. 1, showing the coffee maker in its operative, coffee brewing position.

When it is desired to brew coffee, the support 28 is pivoted to its operative position as shown in FIG. 2 and the coffee container 32 is inserted before the brewing process is started. The container 32 has an open mouth 34 that is in registry with the discharge of the filter compartment 23 when in position as shown in the phantom line view in FIG. 2.

If desired, the container 32 may be an insulated carafe and hence, it is unnecessary to heat the base 31 of the support. Thus, the device can be simplified in construction and more compact in nature. It is to be understood, however, that if desired the base 31 may be heated in an appropriate manner.

It should be readily apparent from the foregoing description that the described coffee brewer 11 is of an extremely compact nature since the support 28 can be pivoted to a storage position. In the illustrated embodiment, the pivot axis provided by the hinge 29 extends horizontally and from side to side relative to the coffee maker 11. However, the axis of the hinge 29 may be rotated through 90° so that the pivotal movement occurs about an axis that extends from front to rear. In this instance, the support panel 33 may be longer so that the base 31 will nest on the opposite side of the housing 13. That is, the configuration should be such that the base 31 will nest on the far side of the water container 18.

In addition to the aforedescribed modified construction, various other changes and modifications may be made without departing from the spirit and scope of the invention, as defined by the appended claims.

What is claimed is:

1. An automatic coffee maker adapted to be supported by means other than standing upon a counter top comprising a main housing, a water compartment carried by said main housing and adapted to hold an amount of water, heating means for heating the water from said water compartment, a filter compartment carried by said main housing and adapted to contain coffee, means for communicating heated water from said heating means to said filter compartment, said filter compartment having a brewed coffee outlet for discharging of liquid brewed coffee, and container supporting means movably carried by said main housing between an extended brewed coffee container supporting position wherein the coffee container is supported with its mouth positioned to receive brewed coffee from said brewed coffee outlet and a retracted position wherein said container supporting means is nested around the other components of said coffee maker.

2. An automatic coffee maker according to claim 1 wherein the coffee container supporting means is pivotally carried by the housing.

3. An automatic coffee maker according to claim 2 wherein the pivot axis of the coffee container supporting means is horizontal.

4. An automatic coffee maker according to claim 1 wherein the housing means has a generally rectangular configuration defining a water compartment containing recess at one side thereof and a filter compartment containing recess at the other side thereof, the container supporting means being pivotally supported about a pivot axis that is juxtapose to the filter container receiving cavity.

5. An automatic coffee maker according to claim 4 wherein the coffee container supporting means is pivotally carried by the housing.

6. An automatic coffee maker according to claim 5 wherein the pivot axis of the coffee container supporting means is horizontal.

* * * * *